United States Patent
Tang et al.

(10) Patent No.: US 12,246,448 B2
(45) Date of Patent: Mar. 11, 2025

(54) SYSTEM AND METHOD FOR OBJECT SHAPE IDENTIFICATION AND POSE MEASUREMENT USING MULTI-FINGERED HAND

(71) Applicants: MAGNA INTERNATIONAL INC., Aurora (CA); Chinpei Tang, Troy, MI (US); Alexander Zak, Troy, MI (US)

(72) Inventors: Chinpei Tang, Troy, MI (US); Alexander Zak, Troy, MI (US)

(73) Assignee: MAGNA INTERNATIONAL INC., Aurora (CA)

( * ) Notice: Subject to any disclaimer, the term of this patent is extended or adjusted under 35 U.S.C. 154(b) by 449 days.

(21) Appl. No.: 17/617,992

(22) PCT Filed: Jun. 11, 2020

(86) PCT No.: PCT/US2020/037165
§ 371 (c)(1),
(2) Date: Dec. 10, 2021

(87) PCT Pub. No.: WO2020/252122
PCT Pub. Date: Dec. 17, 2020

(65) Prior Publication Data
US 2022/0314439 A1    Oct. 6, 2022

Related U.S. Application Data

(60) Provisional application No. 62/859,894, filed on Jun. 11, 2019.

(51) Int. Cl.
*B25J 9/16* (2006.01)
*B25J 13/08* (2006.01)

(52) U.S. Cl.
CPC ........... *B25J 9/1612* (2013.01); *B25J 13/084* (2013.01); *B25J 13/089* (2013.01)

(58) Field of Classification Search
CPC ...... B25J 13/084; B25J 13/089; B25J 9/1694; B25J 9/1612; G05B 2219/39518; G05B 2219/40575
See application file for complete search history.

(56) References Cited

U.S. PATENT DOCUMENTS 9,144,905 B1 *   9/2015   Sinapov ................. B25J 9/1671
9,757,862 B2     9/2017   Alt et al.
(Continued)

OTHER PUBLICATIONS

Shape Classification in Rotation Manipulation by Universal Robot Hand (Year: 2008).*

(Continued)

*Primary Examiner* — Adam R Mott
*Assistant Examiner* — Sagar Kc
(74) *Attorney, Agent, or Firm* — Dickinson Wright PLLC

(57) ABSTRACT

A system and method for identifying a shape and pose of an object is provided. The system includes a controller and a grasping device. The grasping device includes a plurality of fingers that are moveable relative to a base. The fingers include one or more tactile sensors attached thereto. The tactile sensors are configured to collect data, such as a 2D image or 3D point cloud, based on points of contact with the object when the object is grasped. The grasping device is configured to roll the object within the fingers and collect additional data. The controller may combine the data and determine the shape and pose of the object based on the combined data.

20 Claims, 2 Drawing Sheets

(56) References Cited

U.S. PATENT DOCUMENTS

| | | | |
|---|---|---|---|
| 9,975,242 B1 | 5/2018 | Stubbs et al. | |
| 2006/0012198 A1 | 1/2006 | Hager et al. | |
| 2008/0027582 A1* | 1/2008 | Obinata | B25J 13/084 73/9 |
| 2012/0123589 A1* | 5/2012 | Kim | B25J 13/084 901/33 |
| 2016/0107316 A1* | 4/2016 | Alt | G01L 1/25 901/1 |
| 2019/0001492 A1* | 1/2019 | Rose | B25J 9/1612 |
| 2019/0001508 A1* | 1/2019 | Li | G05B 13/041 |

OTHER PUBLICATIONS

Fukui, Wataru et al.; High-Speed Tactile Sensing for Array-Type Tactile Sensor and Object Manipulation Based on Tactile Information; Journal of Robotics; Received Jul. 14, 2011, Revised Oct. 11, 2011, Accepted Oct. 18, 2011; 10 pages; vol. 2011, Article ID 691769, Hindawi Publishing Corporation, http://www.hindawi.com.

Bicchi Antonio et al: "Dexterous Grippers: Putting Nonholonomy to Work for Fine Manipulation", International Journal of Robotics Research., vol. 21, No. 5-6, May 1, 2002, pp. 427-442, XP055921608, US ISSN: 0278-3649, DOI: 10.1177/027836402321261968 Retrieved from the Internet: URL:http://journals.sagepub.com/doi/pdf/10.1177/027836402321261968.

Zhanat Kappassov et al: "Tactile sensing in dexterous robot hands Review", Robotics and Autonomous Systems, Jul. 1, 2015, XP055214985, ISSN: 0921-8890, DOI: 10.1016/j.robot.2015.07.015.

Donlon Elliott et al: "GelSlim: A High-Resolution, Compact, Robust, and Calibrated Tactile-sensing Finger",2018 IEEE/RSJ International Conference on Intelligent Robots and Systems (IROS), IEEE, Oct. 1, 2018, pp. 1927-1934, XP033490904,DOI: 10.1109/IROS.2018.8593661 [retrieved on Dec. 27, 2018].

Prado Da Fonseca et al: "Estimating the Orientation of Objects from Tactile Sensing Data Using Machine Learning Methods and Visual Frames of Reference",Sensors, vol. 19, No. 10, May 17, 2019, p. 2285, XP093186913,CH ISSN: 1424-8220, DOI: 10.3390/s19102285 Retrieved from the Internet:URL:https://www.mdpi.com/1424-8220/19/10/2285/pdf.

* cited by examiner

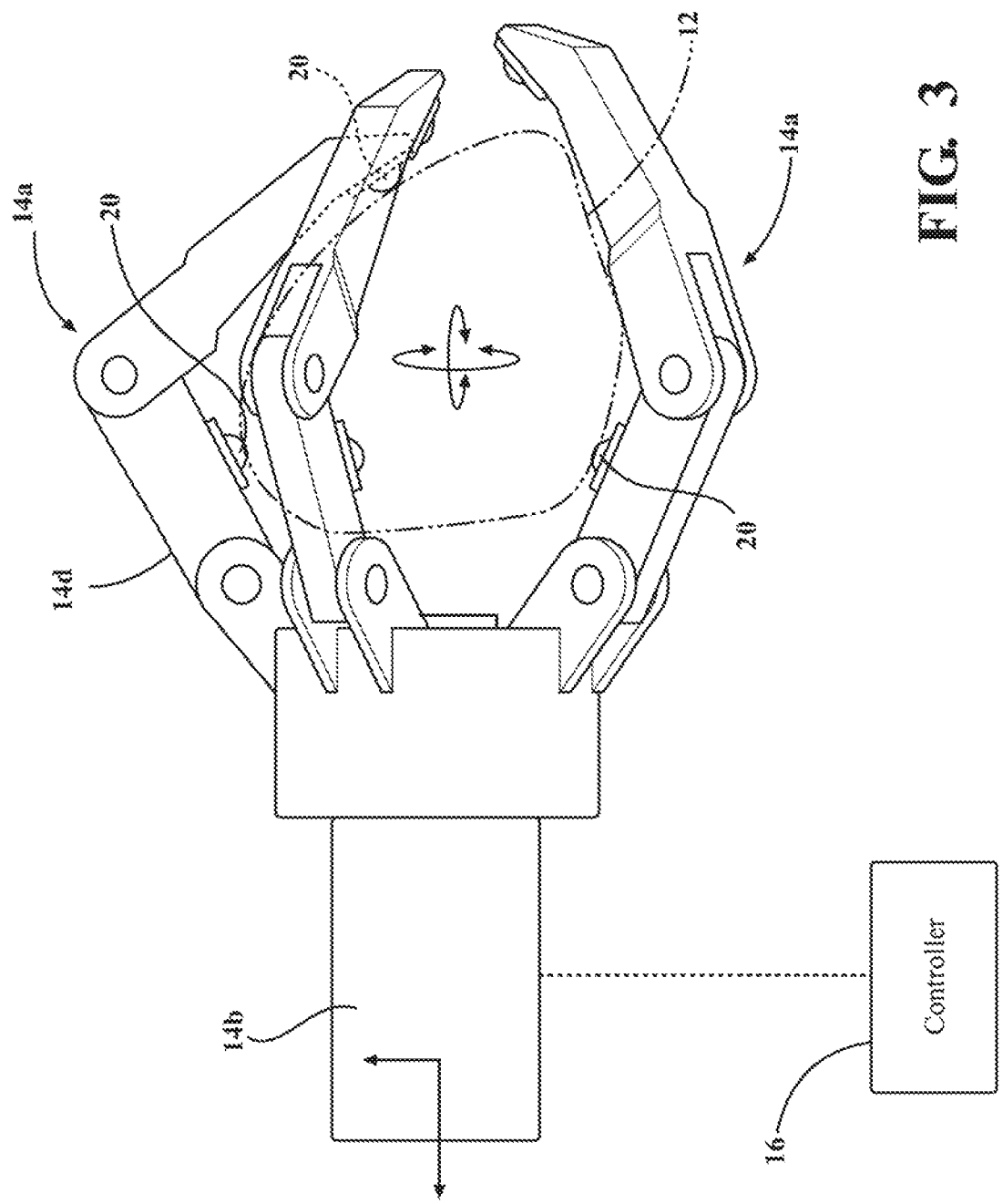

SYSTEM AND METHOD FOR OBJECT SHAPE IDENTIFICATION AND POSE MEASUREMENT USING MULTI-FINGERED HAND

CROSS-REFERENCE TO RELATED APPLICATIONS

This U.S. National Stage Patent Application claims the benefit of PCT International Patent Application Serial No. PCT/US2020/037165 filed Jun. 11, 2020 entitled "SYSTEM AND METHOD FOR OBJECT SHAPE IDENTIFICATION AND POSE MEASUREMENT USING MULTI-FINGERED HAND" which claims the benefit of and priority to U.S. Provisional Patent Application Ser. No. 62/859,894, filed June 11, 2019, titled "System And Method For Object Shape Identification And Pose Measurement Using Multi-Fingered Hand," the entire disclosures of which are hereby incorporated by reference.

TECHNICAL FIELD

The present disclosure relates to object detection and manipulation. More particularly, the present disclosure relates to a system and method for automatically determining a shape and position of an object being manipulated.

BACKGROUND OF THE DISCLOSURE

Industrial applications frequently involve the identification and manipulation of various objects. For example, in an assembly line, various components may be handled and manipulated before being assembled together into an assembly or sub-assembly or added to a pre-existing assembly or sub-assembly.

The objects or components being handled or manipulated can have various sizes and shapes. For a given size and shape, the object or component may have a multitude of different orientations when being handled. For proper assembly, the component must be manipulated to a predetermined orientation relative to the component to which it will be assembled.

In some cases, the component may be symmetrical about one or more axes. In such instances, the component may have more than one orientation that is suitable for installation relative to the base assembly or component to which the component is to be installed. In other cases, the component may be asymmetrical, such that the component must be oriented in a single orientation to enable installation.

Component assembly may be accomplished manually, such as by hand or via the use of manually manipulated tools that are operated by worker. Component assembly may alternatively be accomplished automatically via the use of robotic mechanisms. In such instances, the robotic mechanism may grasp the component and manipulate the component to the desired orientation.

In both manual and robotic manipulation, it is necessary to identify the shape and orientation of the object relative to the grasping mechanism. In the case of manual handling, the worker will typically visually observe the shape of the component and grasp the component while observing the orientation, and may then manipulate the orientation of the component based on the worker's visualization of the component.

In a robotic approach, cameras or other visualization mechanisms may view the device, and determine an orientation of the component, and the robotic mechanism may be controlled in response to the determined orientation to manipulate the component to the desired orientation.

In the case of robotic manipulation, it is necessary for the system to identify the shape of the component or the specific component being viewed, such that the system can determine, based on the existing orientation, how to manipulate the component to the desired orientation. In the case of a single component being manipulated repeatedly, this approach may be effective. However, in the case of multiple components, it can become more difficult to properly identify which component is being handled. In any event, the shapes and sizes of known components must be established and known prior to handling the object.

In another robotic approach, cameras may be used by a worker that may operate a robotic handling mechanism. In this approach, the worker may view the object or component while the component is being held by the mechanism. However, in this approach, the worker may have a limited view, where the component view be blocked by various structure, including the mechanism itself that is holding the component.

In view of the foregoing, there remains a need for improvements to object identification and manipulation methods.

SUMMARY OF THE INVENTION

A system for determining a physical characteristic and pose of an object is provided, the system comprising: a controller and a processor with instructions stored thereon; a grasping device in communication with the controller, the grasping device configured to grasp an object, wherein the grasping device includes a plurality of fingers attached to a base and the fingers are moveable relative to the base; and one or more tactile sensors attached to the fingers, the tactile sensors configured to detect first data associated with a physical characteristic of the object when the object is grasped by the grasping device; wherein the controller is configured to receive the data from the tactile sensors and to store the data; wherein the fingers are configured to roll the object within the fingers while the object is being grasped, and the tactile sensors are configured to provide second data to the controller associated with additional physical characteristics of the object; and wherein the controller is configured to combine the first data and the second data into combined data, and configured to determine a shape and pose of the object from the combined data.

In one aspect, the first data and the second data are in the form of 2D images.

In one aspect, the first data and the second data are in the form of 3D point clouds.

In one aspect, wherein the first data and the second data are obtained without visualization techniques.

In one aspect, the shape of the object is determined contemporaneously with grasping and manipulation of the object.

In one aspect, plurality of fingers are pivotally attached to a base portion of the grasping device.

In one aspect, the base portion is configured to manipulate the fingers relative to known predetermined coordinates of the base.

In one aspect, the fingers each include a tip portion coupled to and moveable relative to a proximal portion, wherein the proximal portion is attached to the base.

In one aspect, the tactile sensors are attached to the tip portions.

In one aspect, the tactile sensors are vision-based tactile sensors having a camera configured to measure three-dimensional force, wherein the camera captures deformation of a sensor layer.

In one aspect, the tactile sensor is a resistance or capacitive changing sensor or a piezoelectric changing sensor.

In another aspect, a method for identifying a shape and pose of an object is provided, the method comprising: grasping an object with a grasping device, wherein the grasping device includes a plurality of fingers having tactile sensors attached thereto; detecting a first physical characteristic at the tactile sensors and collecting a first data corresponding to the first physical characteristic; receiving, at a controller, the first data from tactile sensors; manipulating the fingers of the grasping device and manipulating the object within the fingers of the grasping device; detecting a second physical characteristic at the tactile sensors and collecting a second data corresponding to the second physical characteristic; receiving, at the controller, the second data from the tactile sensors; combining the first and second data into combined data at the controller; and at the controller, identifying a shape and pose of the object based on the combined data.

In one aspect, the method further includes moving some of the fingers out of contact with the object repeatedly and detecting additional data from tactile sensors at different positions on the object.

In one aspect, the method includes rolling the object within the fingers to obtain the first and second data.

In one aspect, the method includes manipulating the fingers relative to a base portion of the grasping device, the base portion having known predetermined coordinates.

In one aspect, the first and second data are obtained from vision-based tactile sensors, wherein the method includes obtaining an image of sensor layer deformation.

In one aspect, the first and second data are obtained from a resistance or capacitive changing sensor or a piezoelectric changing sensor.

In one aspect, the method includes obtaining a 2d image or 3d point cloud from the tactile sensors.

In one aspect, the method includes obtaining shape information of the object contemporaneously with the grasping of the object.

In one aspect, the method includes automatically creating, at the controller, a model of the object based on the first and second data.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 3 is another view of the system with the object manipulated by the grasping device to a further position.

DESCRIPTION OF THE ENABLING EMBODIMENT

Figure 1:
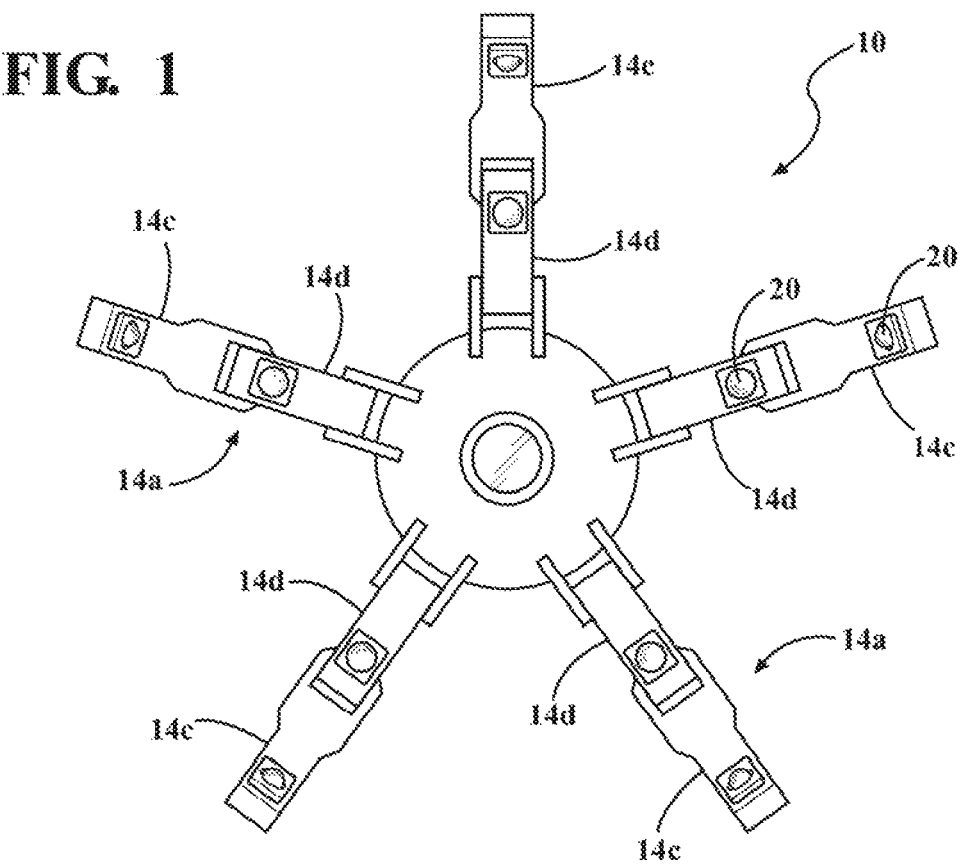
FIG. 1 is a bottom view of grasping device for determining a shape and pose of an object, the grasping device having multiple fingers with tactile sensors attached thereto.
Figure 2:
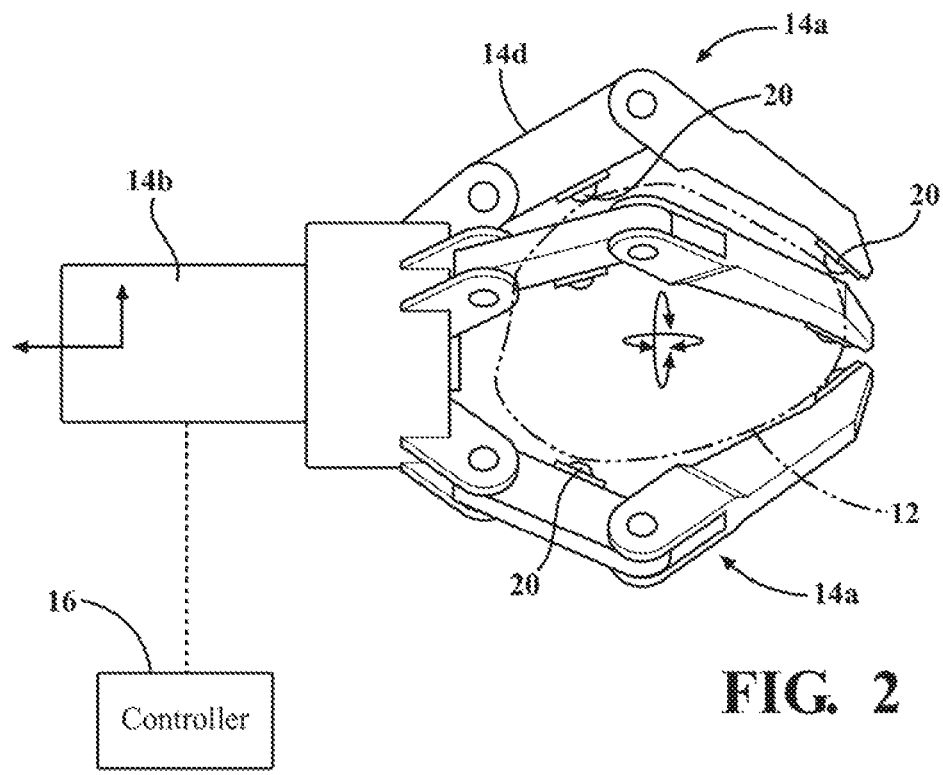
FIG. 2 is a side view of the system for determining a shape and pose of an object, including a controller, the grasping device, and tactile sensors attached to the fingers.

Referring to FIGS. 1-3 and the following description, a system 10 for identifying and manipulating an object 12 includes a grasping device 14 and a controller 16. The system 10 is configured to grasp and manipulate the object 12 and, in doing so, may determine the size, shape, and orientation of the object via the controller 16.

The controller 16 is configured to receive various data from the grasping device 14. Accordingly, the controller 16 is configured to communicate with the grasping device 14 and to receive signals from the grasping device. The controller 16 may communicate with the grasping device via a wired or wireless communication system. Based on the data received from the grasping device 16, software algorithms that are stored, associated, or in communication with the controller 16 may automatically determine the size, shape, and/or orientation of the object 12. For the purposes of discussion, the controller 16 may be configured to execute basic control theory, or may be in the form of a computer having a processor and a storage medium, as well as software and algorithms stored thereon that may be executed by the processor, capable of executing complex processes as well as simple control commands.

The data obtained at the grasping device 14 may be in the form of 2D images or 3D point clouds. In one aspect, the data may be obtained without traditional visualization techniques, such as via cameras or direct human observation. However, it will be appreciated that the data may also include traditional visualization tactics in addition to the non-visualization type data that is obtained. For example, 2D images may be obtained via camera and may be used along with 3D point cloud data detected by the grasping device 14, and the controller 16 may process this variety of data together to detect and determine the size, shape, and orientation of the object 12.

The system 10 may determine the size, shape, and orientation of the object 12 contemporaneously with the grasping and manipulating of the object 12. This is in contrast to prior systems in which object shape and orientation was determined prior to handling. In such prior cases, it can be difficult to ensure proper positioning even with prior information about the shape and supposed orientation.

In one aspect, the grasping device 14 may be a multi-fingered "hand" type device. In one aspect, the grasping device may include two fingers 14a. In another aspect, the grasping device 14 may include three fingers 14a. It will be appreciated that other numbers of fingers 14a could also be used. For the purposes of discussion, two fingers 14a are shown and described.

The fingers 14a may be pivotally attached to a base portion 14b of the grasping device 14. The base portion 14b may include various mechanisms and controls for manipulating the fingers 14a that are attached thereto. The base portion 14b may have a base three-dimensional coordinate axis for determination a position and orientation of the grasping device 14 relative to predetermined "ground" coordinates.

The fingers 14a may be manipulated relative to the base 14b to manipulate the object being handled by the grasping device 14. The fingers 14a may be manipulated in a multi-axis manner, similar to a ball joint, such that the fingers 14a may be positioned in a variety of positions and orientations relative to the base 14b. The fingers 14a may be independently actuatable of positionable, such that one finger 14a may move "up" while another finger moves "down." The fingers 14a may be ultimately controlled by the controller 16 in a robotic manner according to software and instructions stored in the controller.

The fingers 14a may include a tip portion 14c disposed distally relative to the base portion 14b and a proximal portion 14d located proximally relative to the base portion 14b. The proximal portion 14a may be the portion of the finger 14a that is attached to the base 14b and that pivots and/or rotates relative to its connection to the base 14b.

The tip portion 14c of each finger 14a may be moved relative to the proximal portion 14d via pivotable attachment therebetween. Put another way, the tip portion 14c may be connected to the proximal portion 14d via a knuckle. Accordingly, the fingers 14a may "bend" during movement, allowing the tips 14c to move up and down or side to side relative to each other.

The fingers 14a can move and bend in various ways to accommodate different sizes of the object 12 being manipulated. For larger objects, the fingers 14a may spread apart. For smaller objects, the fingers 14a may be drawn together. To roll an object within the fingers 14a, the fingers 14a may move in opposite directions relative to each other. It will be appreciated that various other finger movements relative to each other may be used to manipulate an object within the grasping device 14.

It will be appreciated that the above description of the grasping device 14 is made in reference to the illustration shown in FIGS. 1-3. The grasping device 14 may take on other forms and the above description and representation in the figures shall not be interpreted as being limited to, for example, the two-fingered example described herein. It will be appreciated that the grasping device may take the form of any robotic hand architecture with a multi-link and/or multi-joint arrangement with a plurality of "fingers" or the like. Put another way, the grasping device, generally, may be any device capable of grasping and having multiple link extensions from a base and/or knuckle.

As described above, the grasping device 14 has been described as an automated or robotic device, with the fingers being controlled by the controller. The fingers 14a may be moved robotically in view of commands sent by the controller 16, or the fingers 14a may be moved robotically in view of commands and controls sent by a remote manipulation tool or remote controller, which can be operated by a human.

In another aspect, the grasping device 14 may be in the form of a glove that maybe worn by a human. The grasping device in the form of a glove may similarly include multiple fingers 14a with the above-described portions/sections. Rather than being controlled by a robotic controller, the grasping device 14 may be controlled by human hand manipulation. For the purposes of further discussion, the robotic version of the grasping device 14 will continue to be described. It will be appreciated that the glove version of the grasping device 14 may also be covered by the description herein, unless otherwise noted.

As described above, the grasping device 14 may manipulate the object 12 within the fingers 14a and may determine the size, shape, and orientation of the object 12 during this manipulation. The measurement of the object 12 may be achieved through the use of tactile sensors 20.

The tactile sensors 20 may be disposed on the tips 14c of the fingers 14a of the grasping device. The tactile sensors 20 may also be disposed on other portions of the fingers 14a, such as the proximal portions 14d.

The tactile sensor 20 can be one of many known tactile sensor types. For example, the tactile sensor 20 may be a vision-based tactile sensor, in which a camera is used to measure three-dimensional force. The vision-based sensor may measure geometry, edges, texture or shape of the contact surface. In this approach, the camera associated with the vision-based sensor may capture the deformation of a sensor layer that occurs when the object 12 is grasped. The sensor 20 can include a plurality of reference points that are compressed or shifted in response to contact with an object that creates an impression in the sensor 20, which can be viewed by the associated camera to create a 2d image or 3d point cloud for the contact portion of the object 12 relative to the sensor.

Another type of tactile sensor 20 is a resistance or capacitive changing sensor. These tactile sensors can determine points of contact with the object 12 relative to the sensor 20. The points of contact may be detected by the sensor 20 and stored, providing points that may be added to a 3D point cloud. The tactile sensor 20 may also be a piezoelectric changing sensor. The tactile sensors 20 may vary force, torque, temperature, current, or voltage signals. These signals may be converted into spatial information that may feed into the 3D point cloud data.

Thus, various applications of sensors may be used to detect points of contact between the object 14 and the sensors 20. The position of the sensors 20 is known due to their predetermined placement on the fingers 14a, and the position of the fingers 14a are known based on being controlled relative to the base 14b.

The tactile sensors 20 may be disposed on multiple locations on the fingers 14a, as described above. Accordingly, more than one sensor 20 may be in contact with the object 12 at the same time. The data collected by the sensors 20 at each grasping position can be stored and correlated, thereby defining multiple 2D images or 3D point clouds for each grasped position of the object 12.

For example, when grasping a sphere, the sphere may be in contact with both the tips 14c and proximal portions 14d of each of the fingers 14a, thereby creating four different 2D images or 3D point clouds for a given orientation of the object 12 at a first time. However, when the fingers 14a are in the same position as for grasping the sphere, but are instead grasping a block between the tips 14c, there may only be two different 2D images or 3D point clouds created from contact between the box and the tips 14c, with the proximal portions 14d not in contact with the object 12. Of course, additional and more complex shapes can be grasped by the grasping device 14 and the multiple fingers 14a thereof, which can result in various 2D images and 3D point clouds from the tactile sensors 20. Similarly, as the objects 14 are manipulated by the grasping device 14, different points of contact will be created, thereby informing the system of further characteristics of the shape.

Accordingly, the data from the tactile sensors 20 may be analyzed by the controller 16 as part of the object identification and pose identification of the object 12. The controller 16 also receives data based on the position and orientation of the fingers 14a, the size and shape of which are known and predetermined. Thus, the actual 3D location of the detected points or 2D images can be determined relative to the base coordinate system. For example, the distance between the fingers 14a may be determined, such that the detected data from the sensors 20 can be associated with the spanned distance between the fingers 14a, and more particularly the distance between the sensors 20 that are attached to the fingers 14a.

While the grasping mechanism 14 may grasp and retain the object 12 in a first position, and the object 12 may be relocated or reoriented by moving or orienting the grasping mechanism 14, such movement typically will simply relocate or orient the object 12 within a given space. However, the grasping mechanism 14 will continue to detect the same data from the sensors 20 while the fingers 14a remain in place and grasping the object 12. Thus, the overall shape of the object 12 may require the fingers 14a to grasp the object at additional locations to obtain additional data regarding the shape and size and orientation of the object 12.

When more than two fingers 14a are used, a pair of the fingers 14a may remain engaged and grasping the object 12, while additional fingers 14a may be moved to different locations on the object 12 to collect additional data. This additional data obtained from the sensors 20 that have moved to different locations may be added to the previously obtained data. The initially obtained data and subsequently obtained data may also be referred to as first data and second data. This may be repeated and even more additional data may be collected. However, in some instances, grasping the object 12 with fewer fingers 14a can result in the grasping mechanism 14 losing control of the object 12.

In another aspect, rather than remove one or more fingers 14a from being in contact with the object 12, the fingers 14a may instead be manipulated while maintaining contact with the object 12. For example, the object 12 may be rolled within the fingers 14a. As the object is rolled to a different position, additional data may be obtained from the sensors 20. This additional data may be stored and correlated with the rolling movement caused by the fingers 14a, and the data may be further analyzed by the software algorithm of the controller 16 to determine the shape of the object.

When the fingers 14a continue to manipulate the object, such as via rolling, the object 12 will roll or otherwise move along the sensors 20 of the fingers 14a, thereby creating even more contact points and further 2D and 3D sensor data. As the object 12 is being manipulated, the 2D and/or 3D data may be stitched together to continue to define the shape of the object 12.

After repeated manipulation and data collection from the sensors 20 and analysis from the controller algorithm, the collected data and determined shape may be re-created as a computer solid model, such as a CAD model, of the entire object. Various points on the object that were not explicitly collected may be interpolated based on analysis from the controller 16.

Thus, a model of the object 12 may be created from all of the various data. Using this information, the pose of the object 12 with respect to the grasping device 14 can then be computed. With the pose of the object 12 determined by the controller, the controller 16 can determine how to manipulate the grasping device 14 to re-position or re-orient the object within the grasping device 14 by the moving the fingers 14a. Thus, the object 12 may be precisely positioned.

With the object 12 in a desirable position and orientation, the object 12 may be assembled or placed relative to another object. Accordingly, the system 10 may be used as an assembly aid or a sorting aid, without requiring human observation or visual observation of the object being grasped and manipulated.

Thus, the system 10 may be used to select an object 12 from a group of multiple various objects, such as different objects stored in a common bin, or the like. The grasping device 14, after removing the object 12 from the bin, can thereafter manipulate the object 12, determine the shape of the object 12, determine the pose of the object 12, and orient the object 12 to a desirable orientation.

Thus, the system 10 can allow for common storage of different objects. Objects can be transported and stored together without requiring prior sorting. Reduction in the amount of distinct storage containers or areas can lead to capital cost reduction and other efficiencies.

Moreover, the ability to determine the shape and pose of the object 12 without visual observation from a human or via cameras configured to observe the object 12 and its pose can improve accuracy and reliability and further improved efficiency through automation.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility.

What is claimed is:

1. A system for determining a physical characteristic and pose of an object, the system comprising:
    a controller and a processor with instructions stored thereon;
    a grasping device in communication with the controller, the grasping device configured to grasp an object, wherein the grasping device includes a plurality of fingers attached to a base and the fingers are moveable relative to the base; and
    one or more tactile sensors attached to the fingers, the tactile sensors configured to detect first data associated with a physical characteristic of the object when the object is grasped by the grasping device;
    wherein the controller is configured to receive the data from the tactile sensors and to store the data;
    wherein the fingers are configured to roll the object within the fingers while the object is being grasped, and the tactile sensors are configured to provide second data to the controller associated with additional physical characteristics of the object;
    wherein the controller is configured to obtain the second data associated with additional physical characteristics while the fingers are grasping the object and rolling the object; and
    wherein the controller is configured to combine the first data and the second data into combined data, and configured to determine a shape and pose of the object from the combined data.

2. The system of claim 1, wherein the first data and the second data are in the form of 2D images.

3. The system of claim 1, wherein the first data and the second data are in the form of 3D point clouds.

4. The system of claim 1, wherein the first data and the second data are obtained without visualization techniques.

5. The system of claim 1, wherein the shape of the object is determined contemporaneously with grasping and manipulation of the object.

6. The system of claim 1, wherein the plurality of fingers are pivotally attached to the base of the grasping device.

7. The system of claim 6, wherein the grasping device is configured to manipulate the fingers relative to known predetermined coordinates of the base.

8. The system of claim 6, wherein the fingers each include a tip portion coupled to and moveable relative to a proximal portion, wherein the proximal portion is attached to the base.

9. The system of claim 8, wherein the tactile sensors are attached to the tip portions.

10. The system of claim 1, wherein the tactile sensors are vision-based tactile sensors having a camera configured to measure three-dimensional force, wherein the camera captures deformation of a sensor layer.

11. The system of claim 1, wherein the tactile sensor is a resistance or capacitive changing sensor or a piezoelectric changing sensor.

12. A method for identifying a shape and pose of an object, the method comprising:
- grasping an object with a grasping device, wherein the grasping device includes a plurality of fingers having tactile sensors attached thereto;
- detecting a first physical characteristic at the tactile sensors and collecting a first data corresponding to the first physical characteristic;
- receiving, at a controller, the first data from tactile sensors;
- manipulating the fingers of the grasping device and manipulating the object within the fingers of the grasping device;
- detecting a second physical characteristic at the tactile sensors and collecting a second data corresponding to the second physical characteristic;
- wherein the second physical characteristics and second data are obtained while the object is being grasped and manipulated by the fingers of the grasping device;
- receiving, at the controller, the second data from the tactile sensors;
- combining the first and second data into combined data at the controller; and
- at the controller, identifying the shape and pose of the object based on the combined data;
- wherein the all of the first and second data resulting in the combined data is provided by the tactile sensors and without visualization of the object.

13. The method of claim 12, further comprising moving some of the fingers out of contact with the object repeatedly and detecting additional data from the tactile sensors at different positions on the object.

14. The method of claim 12, further comprising rolling the object within the fingers to obtain the first and second data.

15. The method of claim 12, further comprising manipulating the fingers relative to a base portion of the grasping device, the base portion having known predetermined coordinates.

16. The method of claim 12, wherein the first and second data are obtained from vision-based tactile sensors, wherein the method includes obtaining an image of sensor layer deformation.

17. The method of claim 12, wherein the first and second data are obtained from a resistance or capacitive changing sensor or a piezoelectric changing sensor.

18. The method of claim 12, further comprising obtaining a 2d image or 3d point cloud from the tactile sensors.

19. The method of claim 12, further comprising obtaining shape information of the object contemporaneously with the grasping of the object.

20. The method of claim 12, further comprising automatically creating, at the controller, a model of the object based on the first and second data.

\* \* \* \* \*